United States Patent [19]

Walko et al.

[11] Patent Number: 5,027,853
[45] Date of Patent: Jul. 2, 1991

[54] LIMIT SWITCH REPLACEMENT SYSTEM AND UNIVERSAL BRACKET

[75] Inventors: Ronald Walko, Ford City; Thomas Kallay; Kevin Kallay, both of Verona, all of Pa.; Robert Holden, Raleigh, N.C.; Andrew Gavrilos, New Kensington, Pa.

[73] Assignee: Electronic Technology Systems, Inc., New Kensington, Pa.

[21] Appl. No.: 341,798

[22] PCT Filed: Apr. 22, 1987

[86] PCT No.: PCT/US87/00941
§ 371 Date: Feb. 21, 1989
§ 102(e) Date: Feb. 21, 1989

[87] PCT Pub. No.: wo88/08497
PCT Pub. Date: Mar. 11, 1988

[51] Int. Cl.[5] .............................................. F16K 37/00
[52] U.S. Cl. ................................ 137/554; 340/870.35
[58] Field of Search ..................... 137/554; 340/870.35

[56] References Cited

U.S. PATENT DOCUMENTS

| 1,709,104 | 4/1929 | Wilhjelm | 137/554 |
| 4,013,911 | 3/1977 | Fujiwara et al. | 340/870.35 |
| 4,059,960 | 11/1977 | Osborne | 137/554 X |
| 4,216,795 | 8/1980 | Cobb et al. | 137/554 |
| 4,518,008 | 5/1985 | Fenster et al. | 137/554 |
| 4,523,286 | 6/1985 | Koga et al. | 137/554 X |

Primary Examiner—John Rivell
Attorney, Agent, or Firm—Andrew J. Cornelius

[57] ABSTRACT

Apparatus which monitors the extent to which a mechanical valve (2) is opened which employs a rotary position transducer (5). The rotary position transducer (4) provides a signal representative of valve (2) position to a signal processor (10, 140 for analysis. The signal processor (10, 14), in turn, activates various announciator lights (122, 124) which provide a visual indication of valve (2) position and sends signals to other apparatus (21) associated with the valve (2). Also provided is a mounting (30, 32, 44, 102, 104) for apparatus which monitors the extent to which a mechanical valve (2) is opened.

3 Claims, 3 Drawing Sheets

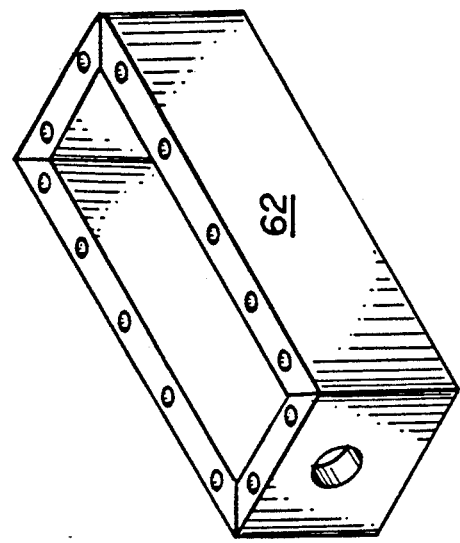
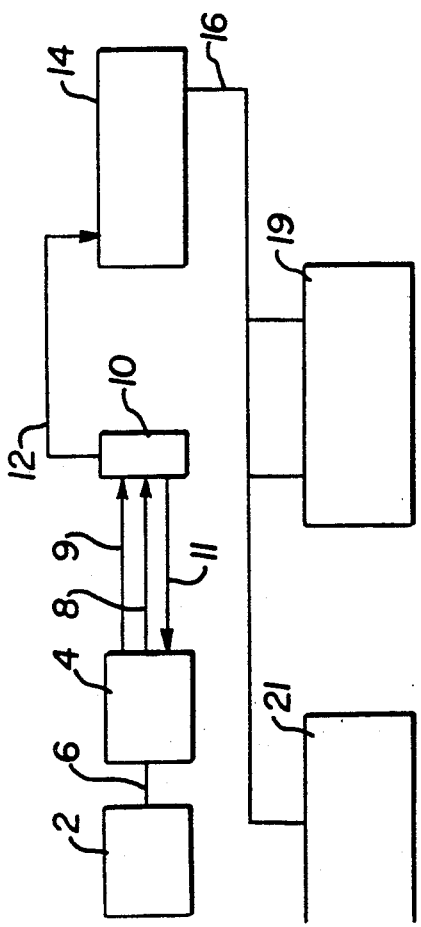
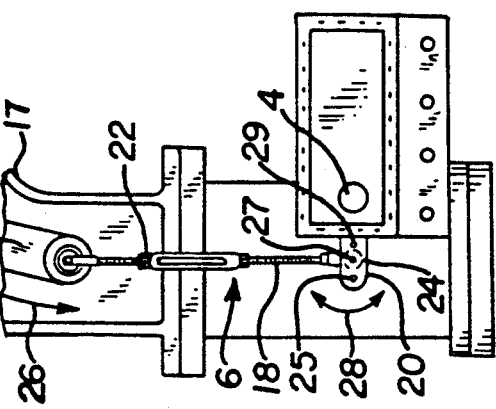
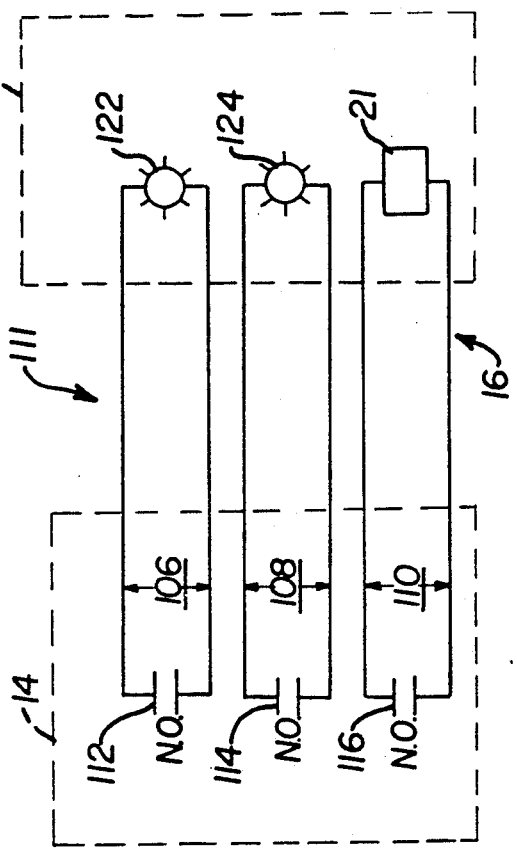

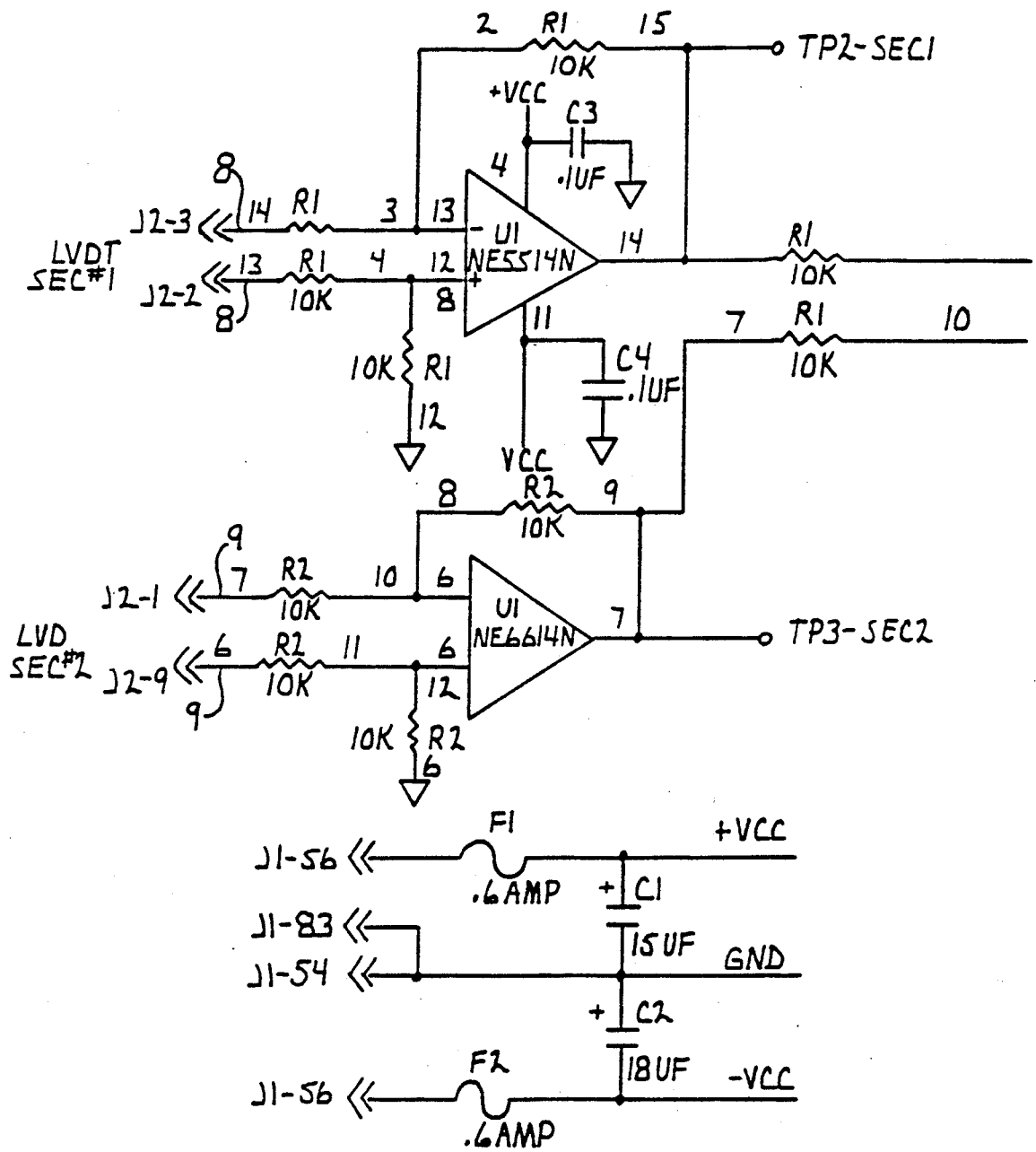
FIG. 6  POWER SUPPLY

LIMIT SWITCH REPLACEMENT SYSTEM AND UNIVERSAL BRACKET

TECHNICAL FIELD

This invention relates to apparatus which is capable of determining the extent to which a mechanical valve is opened or closed and, more particularly, it relates to such apparatus which does not require the employment of mechanical switches to make such a determination of valve position.

BACKGROUND ART

Mechanical valves are employed in a wide variety of applications and used, frequently, to control fluid flowing through conduits such as pipe. One particular application where valves are employed involves the control of steam flow through steam turbines used in electric power generation. For example, Westinghouse Electric Company steam turbines employ several different types of valves, typically identified as throttle valves, governor valves, interceptor valves and re-heat valves. Similar valves are used on General Electric Company turbines. However, instead of the terms "throttle valve" and "governor valve", General Electric Company employs the terms "stop valve" and "control valve", respectively.

Presently, the extent to which some of these valves are opened or closed (position of the valve), is determined by a device known as a mechanical limit switch. A mechanical limit switch employs a centrally pivoting arm which attaches, at one end, to the end of a valve. The position of the valve end provides an indication of valve position and movement of the valve end applies a force to the end of the centrally pivoting arm to which the valve end is attached. That force causes the arm to pivot in relation to the position of the valve thereby swinging the opposite end of the arm about an arc. Positioned in proximity to that end of the arm are mechanical switches which are turned on or off when contacted by the end of the arm. Because the position of the arm is a function of the position of the valve, the position of the switches (on or off) is representative of the position of the valve. The switches, in turn, operate various indicator lights or provide signals to other electrical circuits. Because the position of the switches is representative of the position of the valve, such lights or signals, likewise, represent the position of the valve.

Such apparatus, however, is not without problems. A major problem occurs when the valve is changing position rapidly, which causes the pivotal arm to move rapidly which, in turn, causes the end of the arm to strike the electrical switches at high speed and force. That frequently causes such switches to fail, necessitating that the equipment be removed from service until repairs can be effectuated. Such switch failure also creates the risk that important safety equipment will not be properly signaled when the position of a valve changes, thereby defeating the built-in safety features and enhancing the possibility of an accident. Also, no dependable, readily available, highly accurate valve position indicators exist for interceptor and re-heat valves.

The present invention overcomes the inherent problems of such mechanical limit switches by eliminating the switches themselves, thereby eliminating a prime source of failure.

DISCLOSURE OF THE INVENTION

The present invention provides apparatus for determining the position of a valve which includes a rotary position transducer for providing a continuously variable electrical signal relative to the position of the valve and a valve interface in communication with the valve and the rotary position transducer for providing a rotary position signal to the rotary position transducer relative to the position of the valve. Also provided is mounting apparatus in communication with the rotary position transducer for relatively positioning the rotary position transducer and the valve interface with the valve.

Additionally provided is a mounting for apparatus for determining the position of a valve which includes relative positioning apparatus for relatively positioning a rotary position transducer and a valve interface with the valve.

BRIEF DESCRIPTION OF DRAWINGS

The following detailed description of the preferred embodiment can be understood better if reference is made to the drawings, in which:

FIG. 1 is a block diagram of the present invention;

FIG. 2 is an elevational view showing a steam turbine valve end connected to the apparatus of the present invention;

FIG. 5 is a perspective view of the enclosure of FIGS. 2, 3, and 4;

FIG. 7 is a schematic diagram of the signalling circuit of FIG. 1.

MODES FOR CARRYING OUT THE INVENTION

Figure 4:
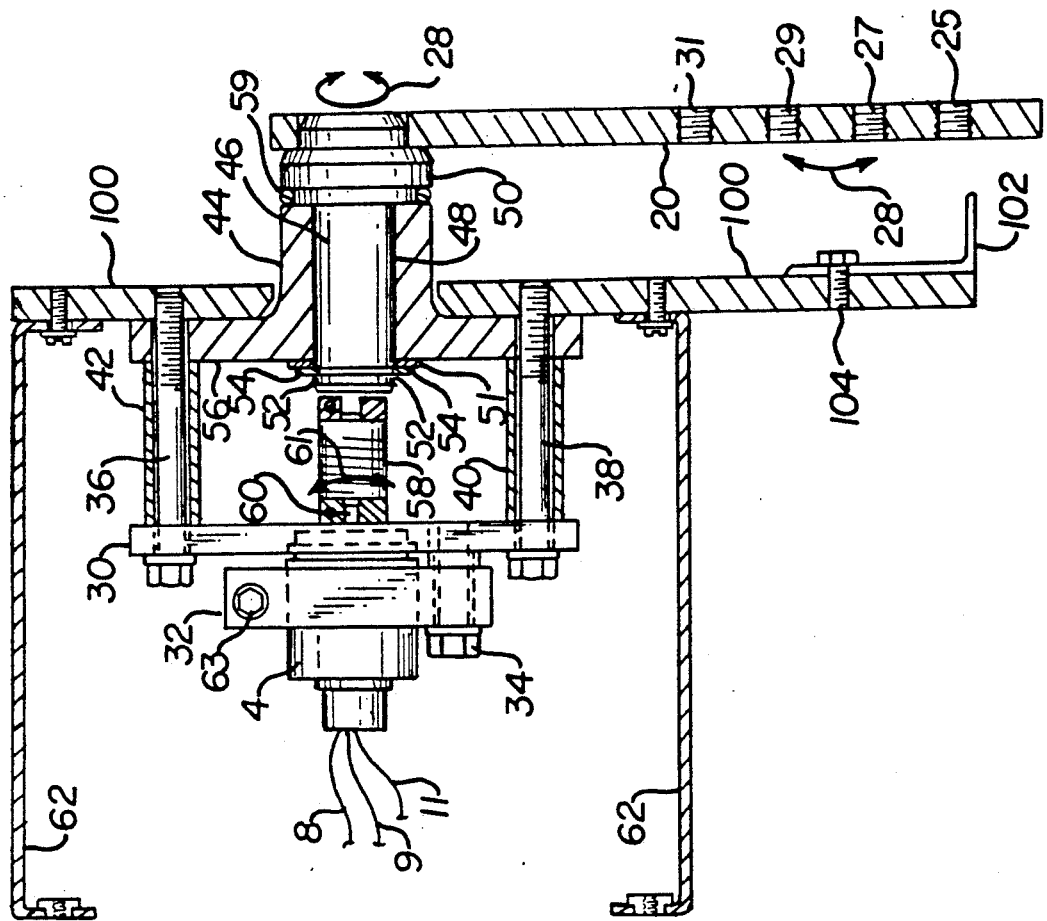
FIG. 4 is a side elevational view, in section, of the apparatus of the present invention.

FIG. 1 shows the cooperation among the various components of the present invention for monitoring the position of valve 2. Valve 2 is mechanically connected to rotary position transducer 4 through valve interface 6. In its preferred form, rotary position transducer 4 is a rotary variable differential transformer manufactured by Schaevitz Engineering of Pennsauken, N.J. As will be explained in detail below, rotary position transducer 4 translates the rotational, or angular, position of rotary input 60 (FIG. 4) into an electrical signal on electrical conductors 8 and 9. Also shown is electrical conductor 11 which provides excitation from signal conditioner 10 to rotary position transducer 4. The construction, operation and input/output characteristics of rotary position transducer 4 are well known to those skilled in the art.

The electrical signal output of rotary position transducer 4, which is representative of the position of valve 2, is transmitted over electrical conductors 8 and 9. Each of conductors 8, 9 and 11 comprise a pair of wires. The output of rotary position transducer 4, on conductors 8 and 9, is in the range of −1 volt (v) to +1 v when the angular position of rotary input 60 is varied over a range of 80 degrees. The relation between the angular position of rotary input 60 and the output voltage on conductors 8 and 9 are well known to those skilled in the art.

Figure 6:
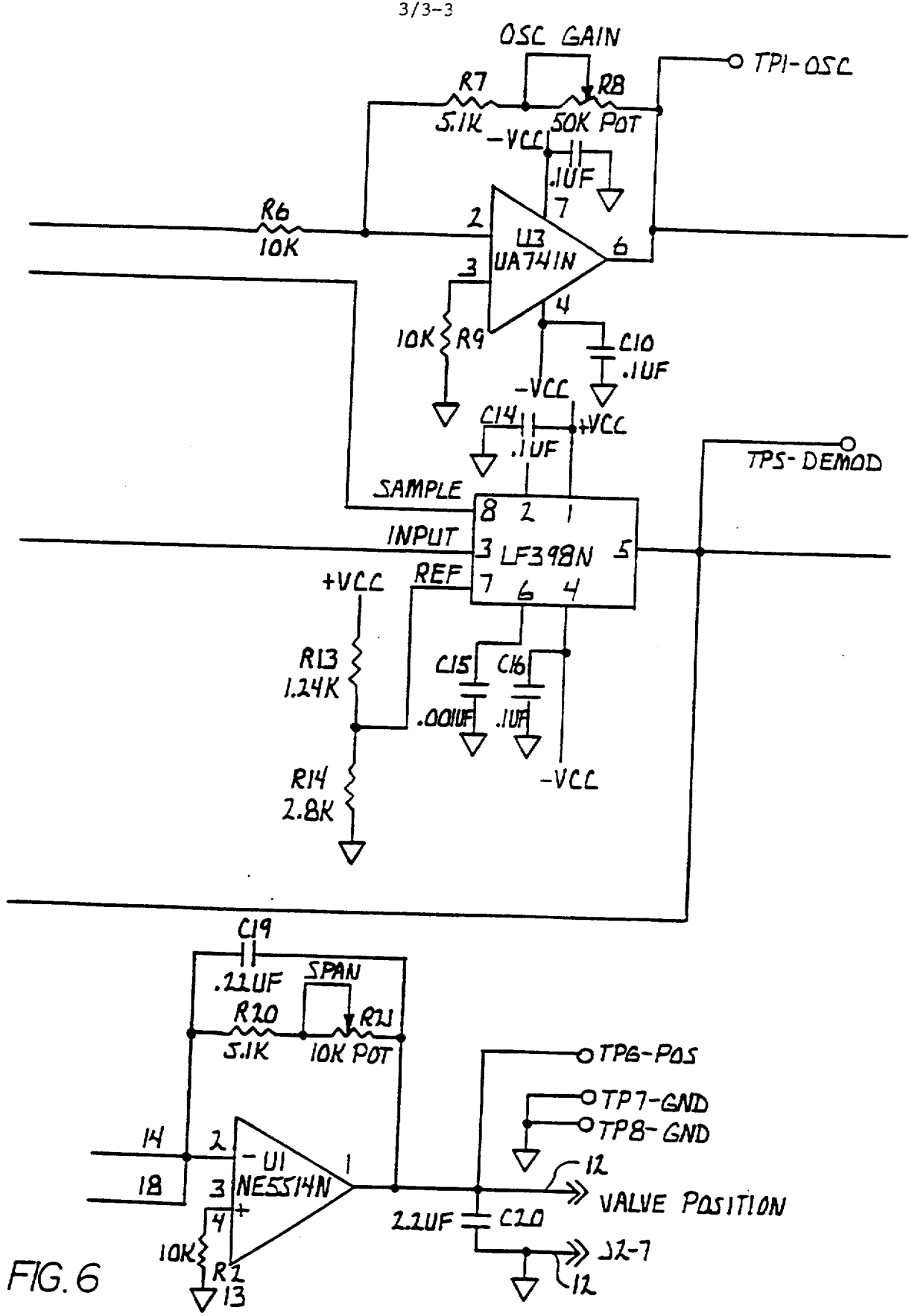
FIG. 6 is a schematic diagram of the signal conditioner of FIG. 1.
Figure 6:
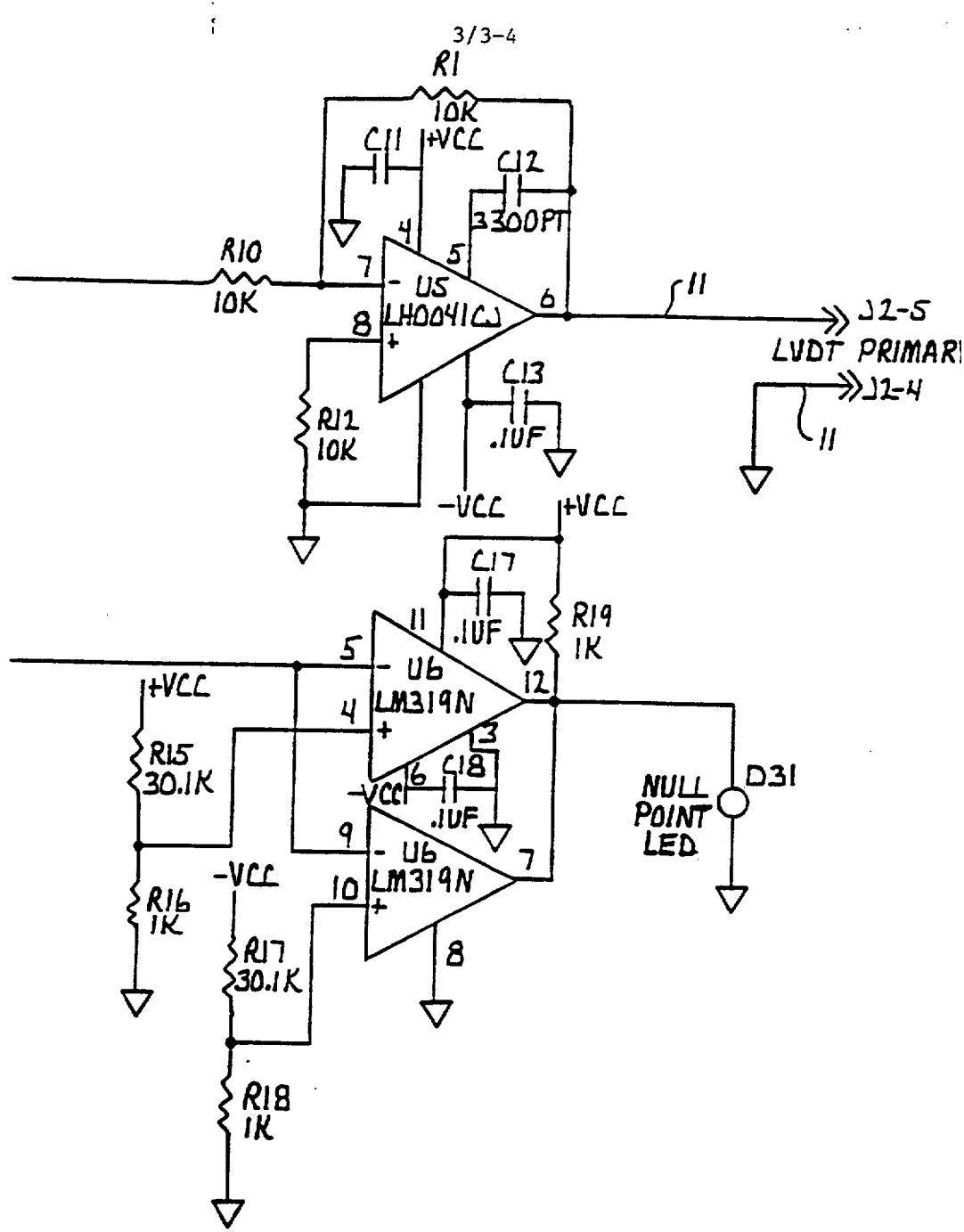

Signal conditioner 10, in addition to providing excitation to rotary transducer 4 through conductor 11, transduces the output signal of rotary position transducer 4 into a signal which appears on output 12 and which ranges from 0 v to +10 v. The schematic diagram of signal conditioner 10 is shown in FIG. 6. All of the components of and the construction of signal conditioner 10, as shown in FIG. 6, are well known to those skilled in the art.

Computer 14 receives the signal from output 12 and analyzes it. Computer 14 is designed to receive a plurality of input signals, one for each valve which is monitored. However, for purposes of clarity, only one valve is shown. When used with a plurality of valves, one rotary position transducer 4 and one signal conditioner 10 would be required for each valve. Each output 12 of each such signal conditioner 10 would be connected to a single computer 14. Output 16, of computer 14, provides the input to annunciator panel 19 and plant trip circuits 21. Plant trip circuits 21 form part of the overall plant equipment and are not a part of the present invention. Although a variety of devices may be employed as computer 14, it is preferred that computer 14 be an Allan Bradley Programmable Controller Model Mini PLC—2/05 which is widely available on the market.

FIG. 2 shows the mechanical connection between valve 2, which is positioned within valve body 17, and rotary position transducer 4. Valve interface 6 comprises linkage rod 18 and crank arm 20. Linkage rod 18 includes turnbuckle 22 which is used to adjust the distance between valve 2 and crank arm 20. Linkage rod 18 is connected to crank arm 20 through pivotal connector 24. As valve 2 opens and closes, valve 2 moves generally along the path shown by arrow 26. That, in turn, causes crank arm 20 to pivot along the arc shown by arrow 28. The longitudinal position of pivotal connector 24, along crank arm 20, is selected by locating pivotal connector 24 in one of holes 25, 27, 29 or 31 so that when valve 2 moves between full opened and full closed position, rotary input 60 rotates ±40 degrees with respect to its angular position when valve 2 is at midstroke.

Figure 3:
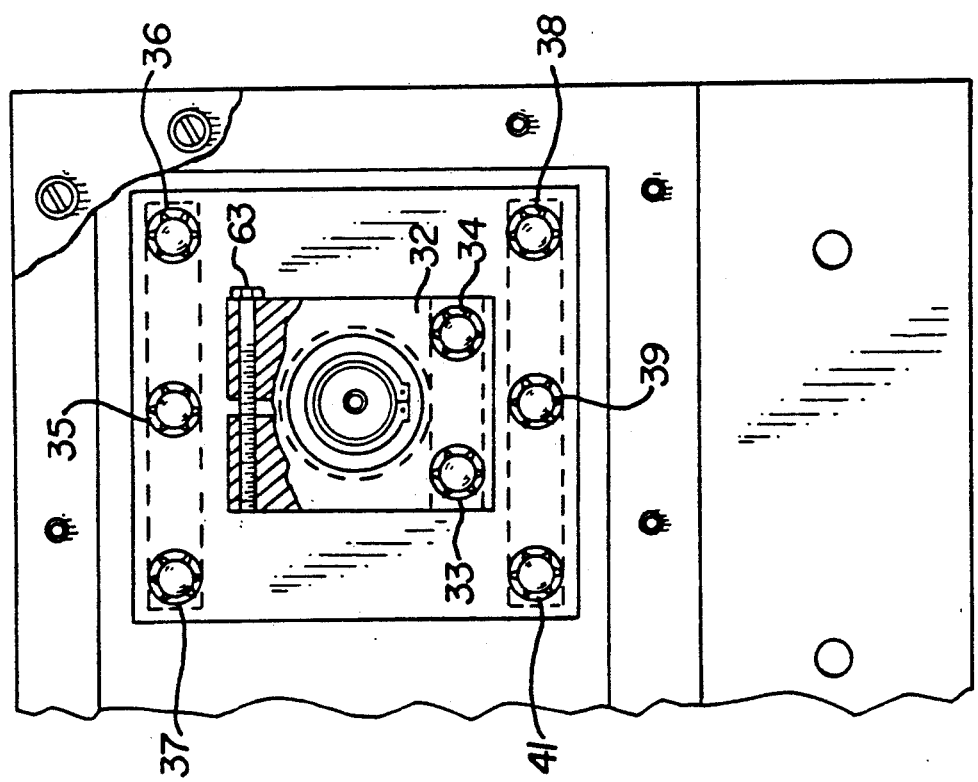
FIG. 3 is a front elevational view, partially in section, of the mounting for the apparatus of FIGS. 1, 2 and 4.

FIGS. 3, 4 and 5 show the details of the cooperation of the various components of the present invention, and how movement of valve 2 is converted to a signal on electrical conductors 8 and 9. Rotary position transducer 4 is affixed to plate 30 by mounting bracket 32, bolts 33 and 34 and pinch bolt 63. Plate 30, in turn, is attached to mounting plate 100 by bolts 35, 36, 37, 38, 39 and 41. Plate 30 is spaced from mounting plate 100 through the use of sleeves 40 and 42 which surround bolts 38 and 36, respectively. Similar sleeves are employed in conjunction with bolts 35, 37, 39 and 41 (not shown). Bolts 35, 36, 37, 38, 39 and 41 also secure collar 44 to mounting plate 100. Collar 44, in turn, supports cylinder 46 which rotates within opening 48 of collar 44. Cylinder 46 is welded to crank arm 20 thereby causing both of those members to rotate together. Spacer 50 provides relative positioning between crank arm 20 and collar 44. O-ring 59 is used to seal opening 48 of collar 44. Mounting plate 100 is secured to valve 2 through angle iron 102. Angle iron 102 is secured to mounting plate 100 by bolt 104.

To prevent cylinder 46 from sliding out of opening 48 of collar 44, groove 52 is formed in cylinder 46. Ring 54, which has an inner diameter generally equal to the outer diameter of groove 52 and an outer diameter greater than opening 48 is positioned within groove 52. The portion of ring 54 which projects beyond the outer diameter of cylinder 46 contacts washer 51 which, in turn, contacts the surface of collar 44, thereby preventing cylinder 46 from becoming disengaged from collar 44. Helical coupling 58 is, preferably, a Helical Double Flexing Shaft Coupling which is manufactured by Helical Products of Santa Monica, Calif. The construction and use of Helical Coupling 58 are well known to those skilled in the art.

Helical coupling 58 is mechanically connected to rotary input 60 of rotary position transducer 4, and compensates for any misalignment between rotary input 60 and cylinder 46. Thus, when crank arm 20 pivots in the direction of arrow 28, cylinder 46 rotates helical coupling 58 which, in turn, rotates rotary input 60 of rotary position transducer 4. Therefore, the linear movement of valve 2, shown by arrow 26, is converted to rotational movement of rotary input 60, shown by arrow 61. To provide protection to rotary position transducer 4, enclosure 62 surrounds the apparatus. Enclosure 62 is preferably a N. E. M. A. Type 12 enclosure modified to accept electrical conduit. Such modification is well known to those skilled in the art.

It is, frequently, desirable to know whether each particular valve of a steam turbine is between 0 and 5% of full open, 95% to 100% of full open or between 5% and 95% full open within about ±1%. To provide such information, output 16 comprises a plurality of pairs of wires with three such pairs being associated with each valve.

FIG. 7 shows a schematic diagram of signalling circuit 111. Signalling circuit 111 includes one set of three pairs of wires 106, 108 and 110 which are connected to normally open contacts 112, 114 and 116, respectively. Pairs 106, 108 and 110 comprise output 16. D.C. power, preferably in the range of 24 v, is supplied to pairs 106 and 108 so that when contact 112 is closed, lamp 122 will be illuminated and when contact 114 is closed, lamp 124 will be illuminated. Lamps 122 and 124 are located on annunciator panel 19. The construction and use of the power supply are well known to those skilled in the art. Pair 110 provides an open or closed electrical circuit through contact 116 to plant trip circuits 21. Contacts 112, 114 and 116 are located within computer 14 on a printed circuit board (not shown) preferably manufactured by Allan Bradley Company and marketed as Model 177102 Contact Output Cards. The use and construction of those Contact Output Cards are well known to those skilled in the art. One signalling circuit 111 is provided for each valve monitored.

When computer 14 determines that valve 2 has closed to 5% or less of full open it closes contact 112 thereby illuminating lamp 122. Also, contact 116 is closed thereby signalling plant trip circuits 21 that valve 2 is opened 5% or less of full open. To prevent contact chatter when valve 2 is approximately 5% opened, computer 14 will not open contacts 112 and 116 until valve 2 reopens to about 6% of full open. Therefore, when contacts 112 and 116 are closed, and lamp 122 is illuminated, valve 2 is opened between 0% and 6% of full open.

When computer 14 determines that valve 2 has opened to 95% or more of full open, it closes contact 114 thereby illuminating lamp 124. Again, to prevent contact chatter when valve 2 is approximately 95% opened, computer 14 will not open contact 114 until valve 2 closes to 94% of full open. Therefore, when contact 114 is closed and lamp 124 is illuminated, valve 2 is opened between 94% and 100% of full open. When neither lamp 122 nor lamp 124 is illuminated, therefore, valve 2 is between 5% and 95%, ±1%, of full open.

The opening and closing of contacts 112, 114 and 116 are controlled by computer 14 which operates according to the appended program which is incorporated herein by reference. The program is designed to analyze the signal on electrical conductor 12, determine the position of each valve and open or close the electrical contacts to provide a visual indication of valve position and to signal the turbine's plant trip circuits. It may be appreciated that, while in this particular example contacts open or close at 5%, 6%, 94% and 95% of full valve open, such ranges may be varied as required. Also, more or less ranges may be provided by adding or deleting one or more signalling circuits 111. Also, output 12, of signal conditioner 10, may be directly monitored, thereby providing a continuously variable signal which is representative of the position of valve 2. In such an application computer 14 and output 16 would not be employed.

In addition to the various features and components described herein, the present invention also includes a switch (not shown), which is preferably operated by a key to prevent unauthorized operation, which tests the lamps on annunciator panel 19. When this switch is activated, it sends a signal to computer 14. The program of computer 14 then sequentially illuminates the lamps, for a short period of time, thereby providing visual verification that the lamps are operating properly.

Also provided is a power supply monitoring circuit (not shown) which monitors the output of the power supply to ensure that the proper voltage for signal conditioner 10 is constantly available. If at any time such voltage is not maintained, this circuit sends a signal to computer 14 which, in turn, opens all contacts which operate the lamps on annunciator 19 thereby alerting the operator of a malfunction. These lamp test and power supply monitor circuits are easily constructed and well known to those skilled in the art.

To prevent plant trip circuits 21 from falsely activating when service is performed, a key locked trip disable switch (not shown) is provided to prevent such signals from reaching plant trip circuit 19 when service is being performed. Such circuitry is well known to those skilled in the art.

Additionally, the program of computer 14 monitors output 12 of signal conditioner 10 to determine whether a valid reading is present on output 12. If an invalid reading is present on output 12, all of the contacts which operate the lamps on annunciator 19 open, thereby alerting the operator that there is a malfunction of signal conditioner 10. Contact 116 is not altered under this circumstance. Also, should any component of the system fail to operate within preset time limits, the program of computer 14 will likewise open all contacts which operate the lamps on annunciator 19 indicating a malfunction. Contact 116 is, similarly, not altered under this circumstance.

It will be evident to those skilled in the art that, for purposes of illustration, the details of the invention have been described for use with steam turbines. However, the present invention may be used in conjunction with valves of other devices as well, and, in particular, may be used in conjunction with valves on a powerhouse boiler.

It may be appreciated, therefore, that the apparatus of the present invention provides a convenient system for monitoring the position of mechanical valves and providing appropriate signals relative thereto.

INDUSTRIAL APPLICABILITY

The way in which the present invention is capable of exploitation in industry and the way in which it can be made and used is deemed to be obvious from the description or nature of the invention.

Whereas particular embodiments of the invention have been described for purposes of illustration, it will be evident to those skilled in the art that numerous variations of the details may be made without departing from the invention as defined in the appended claims.

What is claimed is:

1. Apparatus for determining the position of a valve comprising:
    rotary position transducer means for providing a continuously variable electrical signal relative to the position of the valve;
    valve interface means in communication with the valve and said rotary position transducer means for providing a rotary position signal to said rotary position transducer means relative to the position of the valve; and
    mounting means in communication with said rotary position transducer means for relatively positioning said rotary position transducer means and said valve interface means with the valve;
    said mounting means having support means for rotatably supporting said valve interface means and for supporting said rotary position transducer means;
    said valve interface means having helical coupling means in communication with said rotary position transducer means for providing said rotary position signal to said rotary position transducer means; and
    said support means having plate means for supporting said rotary position transducer means.

2. The apparatus recited by claim 1 wherein said support means has collar means for rotatably supporting said valve interface means.

3. A mounting for apparatus for determining the position of a valve comprising:
    relative positioning means for relatively positioning a rotary position transducer means and a valve interface means with the valve, said relative positioning means having plate means for supporting the rotary position transducer means;
    said relative positioning means having collar means for rotatably supporting the valve interface means.

* * * * *

UNITED STATES PATENT AND TRADEMARK OFFICE
CERTIFICATE OF CORRECTION

PATENT NO. : 5,027,853
DATED : July 2, 1991
INVENTOR(S) : Ron Walko, et al

It is certified that error appears in the above-indentified patent and that said Letters Patent is hereby corrected as shown below:

On the Title Page, Item [57], column 2, line 5; delete the "o" after "14" and substitute therefore --)--.

Signed and Sealed this

Tenth Day of May, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,027,853
DATED : July 2, 1991
INVENTOR(S) : Ron Walko, et. al.

It is certified that error appears in the above-indentified patent and that said Letters Patent is hereby corrected as shown below:

The drawings consisting of Figs., 6b, 6c, and 6d were omitted from the patent should be replaced with the sheets of drawings, as shown on the attached sheets.

Signed and Sealed this

Ninth Day of August, 1994

Attest:

BRUCE LEHMAN

Attesting Officer  Commissioner of Patents and Trademarks

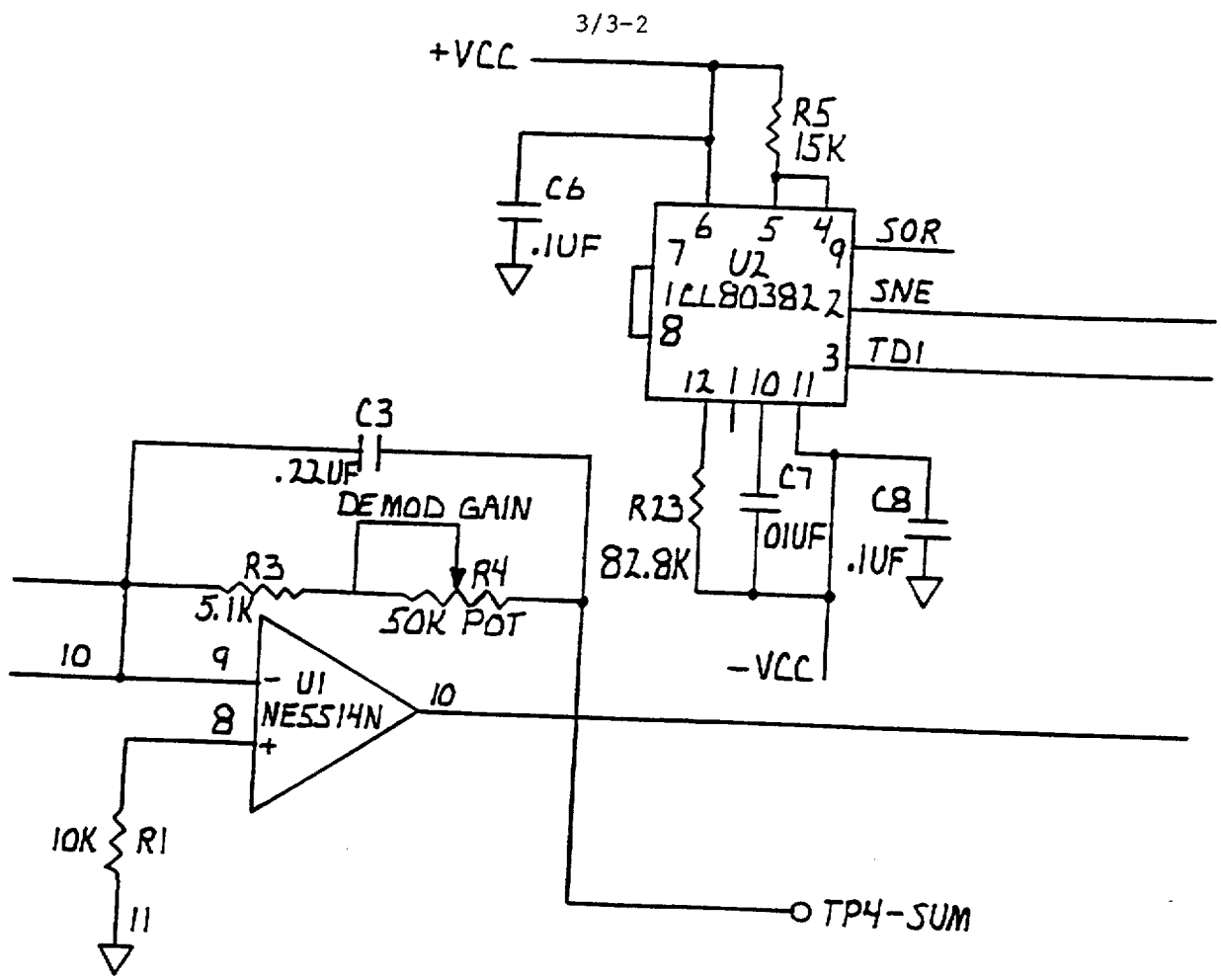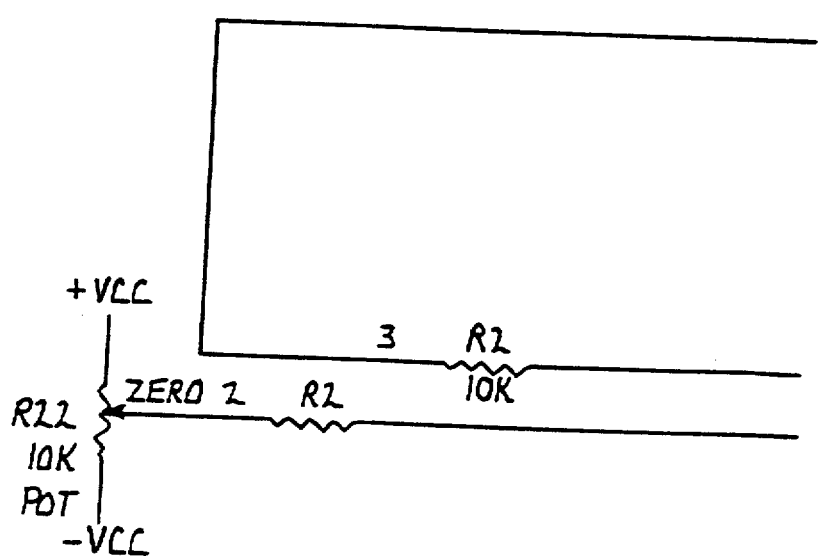
FIG. 6